United States Patent
McMillan et al.

(10) Patent No.: US 8,484,556 B2
(45) Date of Patent: Jul. 9, 2013

(54) DRAWING INTEROPERABILITY BETWEEN DIFFERENT COMPUTER-AIDED DESIGN APPLICATIONS

(75) Inventors: Robert W. McMillan, Wixom, MI (US); Narayanan Krishnan, Howell, MI (US); Prabakar Murugappan, Tigard, OR (US); James M. Clauss, Tigard, OR (US)

(73) Assignee: Autodesk, Inc., San Rafael, CA (US)

( * ) Notice: Subject to any disclaimer, the term of this patent is extended or adjusted under 35 U.S.C. 154(b) by 1244 days.

(21) Appl. No.: 11/669,740

(22) Filed: Jan. 31, 2007

(65) Prior Publication Data

US 2008/0052618 A1   Feb. 28, 2008

Related U.S. Application Data

(60) Provisional application No. 60/839,442, filed on Aug. 22, 2006.

(51) Int. Cl.
*G06F 17/00* (2006.01)
(52) U.S. Cl.
USPC .......................................... 715/249; 715/209
(58) Field of Classification Search
USPC ........................................ 715/209, 248–249
See application file for complete search history.

(56) References Cited

U.S. PATENT DOCUMENTS

| | | | |
|---|---|---|---|
| 4,858,114 A | 8/1989 | Heath et al. | |
| 5,247,650 A | 9/1993 | Judd et al. | |
| 5,412,800 A | 5/1995 | Bril et al. | |
| 5,511,199 A | 4/1996 | Anthias et al. | |
| 5,551,015 A | 8/1996 | Goettelmann et al. | |
| 5,720,022 A * | 2/1998 | Reichert et al. | 345/660 |
| 5,724,590 A | 3/1998 | Goettelmann et al. | |
| 5,832,264 A | 11/1998 | Hart et al. | |
| 6,074,432 A | 6/2000 | Guccione | |
| 6,134,338 A * | 10/2000 | Solberg et al. | 382/113 |
| 6,249,786 B1 * | 6/2001 | Wadewitz | 707/6 |
| 6,336,124 B1 * | 1/2002 | Alam et al. | 715/205 |
| 6,445,974 B1 | 9/2002 | Malaugh et al. | |
| 6,453,464 B1 | 9/2002 | Sullivan | |

(Continued)

FOREIGN PATENT DOCUMENTS

JP    2005301630    10/2005

OTHER PUBLICATIONS

International Search Report. Oct. 10, 2008, U.S., International Application No. PCT/US07/76567.

(Continued)

*Primary Examiner* — Manglesh M Patel
(74) *Attorney, Agent, or Firm* — Patterson & Sheridan, L.L.P.

(57) ABSTRACT

Embodiments of the invention provide data file interoperability between two drawing programs using a single composite drawing file. A method of generating a drawing file shared by a source application and a target application includes storing a copy of a computer aided design (CAD) drawing in a composite drawing file, where the CAD drawing is stored according to a drawing format used by the source application. The method also includes generating a visual representation of the CAD drawing, where the visual representation is formatted according to a drawing format used by the target application. The method also includes storing the visual representation in the composite drawing file, where a display of the visual representation generated by the target application is substantially similar to a display of the CAD drawing generated by the source application.

23 Claims, 6 Drawing Sheets

U.S. PATENT DOCUMENTS

| | | |
|---|---|---|
| 6,698,014 B1 | 2/2004 | Rechter |
| 6,728,950 B2 | 4/2004 | Davis et al. |
| 6,803,927 B1 | 10/2004 | Sahoo et al. |
| 6,847,384 B1 * | 1/2005 | Sabadell et al. ............... 345/672 |
| 7,099,803 B1 * | 8/2006 | Rappoport et al. ............... 703/1 |
| 2004/0103405 A1 | 5/2004 | Vargas |
| 2004/0177089 A1 * | 9/2004 | Love et al. ................ 707/103 R |
| 2004/0199905 A1 | 10/2004 | Fagin et al. |
| 2004/0205545 A1 * | 10/2004 | Bargeron et al. ............. 715/512 |
| 2005/0041028 A1 * | 2/2005 | Coutts ............................ 345/441 |
| 2005/0131938 A1 * | 6/2005 | Sabadell et al. .......... 707/103 R |
| 2005/0144598 A1 * | 6/2005 | Sabadell et al. ............... 717/137 |
| 2005/0256825 A1 * | 11/2005 | Dettinger et al. ................. 707/1 |
| 2006/0136880 A1 | 6/2006 | Sone et al. |
| 2006/0174231 A1 | 8/2006 | Wei et al. |
| 2006/0184922 A1 | 8/2006 | Vera |
| 2006/0184931 A1 | 8/2006 | Rochette et al. |

OTHER PUBLICATIONS

JP Office Action. Application No. 2009-525765 dated Dec. 27, 2011.

* cited by examiner

DRAWING INTEROPERABILITY BETWEEN DIFFERENT COMPUTER-AIDED DESIGN APPLICATIONS

CROSS REFERENCE TO RELATED APPLICATIONS

This application claims the benefit under 35 U.S.C. §119 (e) to provisional application No. 60/839,442, filed Aug. 22, 2006, the entire contents of which are incorporated herein by reference.

BACKGROUND

1. Field of the Invention

The present invention generally relates to computer software. More specifically, the present invention relates to drawing interoperability between different computer-aided (CAD) design applications that employ different document formats.

2. Description of the Related Art

Currently, computer aided design (CAD) applications are available that allow users to compose electronic drawings of two-dimensional (2D) and three-dimensional (3D) objects. The drawings may be stored as a data file, where the content, format and structure of the data file is understood by the CAD application used to create the drawing. Although different CAD applications may be used to compose similar, if not identical, drawings, the format used to store the files may be significantly different. Thus, one feature provided by many CAD applications is the ability to translate documents from one format to another-typically, from the format of a source application to the format of a target application. Similarly, when accessing a drawing created by another CAD application, a drawing file may be translated from a foreign format to a native format.

For example, a designer of industrial machinery may want to share a drawing created using one drawing program ("source application") with an architect who may want to view the drawing using a different drawing program ("target application"). In such a case, the drawing is first translated from the format of the source application to the format of the target application. However, translating the drawing may result in numerous problems. One problem is that the translation process is usually imperfect and results in a copy that is not true to the original. Consequently, the visual representation of the translated drawing is often different from that of the source drawing. The imperfect translation is typically due to the fact that the source application used to create the drawing may have features that are not available in the target application. That is, the drawing format used by a target application may not be able to represent everything included in the drawing format of the source application. Thus, when the drawing is translated, some elements of the source drawing may be lost. This problem is exacerbated when the drawing is modified using the target application and then is viewed again using the source application. In such a case, the drawing essentially undergoes a "round-trip" from a source format to a target format and back again. And at each leg of the trip, the translation process can introduce errors or discrepancies into the drawing.

Another problem is that translating every part of a drawing document can be complex and may consume a significant amount of computer processing time. Such delays may be inconvenient or unacceptable for the user of the drawing program. Further, when multiple copies of a drawing are made (i.e., one in an original or source format and another in a target format), the original drawing and the translated drawing may become unsynchronized. For example, where the original and translated drawings are modified using different programs, one drawing may be modified so that it no longer matches the other drawing. In such cases, the modified drawings may need to be reconciled into a single version, requiring a manual process that is time-consuming and error-prone.

As illustrated by the foregoing reasons, there is a need in the art for improved drawing interoperability between different computer-aided design applications.

SUMMARY OF THE INVENTION

One embodiment of the invention provides a method of generating a drawing file shared by a source application and a target application. The method generally includes generating a drawing file shared by a source application and a target application includes storing a copy of a computer aided design (CAD) drawing in a composite drawing file, where the CAD drawing is stored in the composite drawing file according to a drawing format used by the source application. That is, the composite drawing file may be created using the drawing file format of the target application and used to store a copy of the CAD drawing in the format of the source application. The method also includes generating a visual representation of the CAD drawing, where the visual representation is formatted according to a drawing format used by the target application. The method also includes storing the visual representation in the composite drawing file, where a display of the visual representation generated by the target application is substantially similar to a display of the CAD drawing generated by the source application.

In a particular embodiment, the visual representation includes a set of non-visual objects from the CAD drawing translated into the format of the target application, a set of visual objects from the CAD drawing translated into the format of the target application, and a set of object mappings, wherein each mapping provides a mapping from a visual object in the CAD drawing to a corresponding visual object in the visual representation. Examples of non visual objects include at least a layer definition, a line-type display property, and a line-color display property specified for one of the visual objects in the CAD drawing. Further, in one embodiment, some aspects of the visual representation may be modified using the target application. For example, users may delete visual objects from the visual representation or modify a display property associated with the visual representation. If a user modifies the visual representation of the source drawing using the target application, the modifications are synchronized with the copy of the source drawing when the composite drawing file is accessed using source application.

The target application may also be used to add native objects (i.e., objects created using the drawing format of the target application) objects to the drawing. In such a case, the roles of "source application" and "target application" become effectively reversed. Any such objects may be the basis of a visual representation viewed using the original "source application." Thus, the composite drawing file may contain data in the "native" formats associated with both the source application and target application, and may also contain a visual representation of that native data for viewing/editing performed using the other application. Since native data from both the source and target application is maintained in a single document, synchronization problems between the different CAD applications may be eliminated, allowing the document to be used for many different purposes by users of both CAD applications.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide data file interoperability between two drawing programs using a single composite drawing file. As stated, different computer aided design (CAD) applications normally employ data translation in order to view or edit drawings. The translation process often introduces errors and can also result in multiple versions of a drawing that are not necessarily identical to one another. Embodiments of the invention provide an improved approach where a source application is configured to store native drawing data as an embedded object in a file that also includes (or is used to generate) a highly accurate visual representation of the CAD drawing. Instead of translating the drawing format from the format of the source application to that of the target application, the source application embeds a copy of the drawing in the format of the source application within a composite drawing file. The composite drawing file may be generated according to the drawing file format of the target application. Additionally, the composite drawing file includes a highly accurate visual representation of the drawing that may be processed by the target application to generate a visual representation of the CAD drawing. Since data from both applications is maintained in a single document, the synchronization problems may be eliminated and the document can be used for many different purposes by users of both the source and target applications.

In one embodiment, some aspects of the visual representation may be edited using the target application, for example object deletion or visibility/color control. Additionally, the target application may be used to add drawing elements or data objects native to the target application to the composite drawing file. In such a case, the roles of "source application" and "target application" effectively become reversed, as the target application is used to add objects to the drawing. If a user modifies the drawing using the target application, the modifications are synchronized with the embedded copy of the drawing in the format of the source application, when the composite drawing file is subsequently accessed using the source application.

Embodiments of the invention are described herein relative to the AutoCAD® and Autodesk Inventor® applications available from Autodesk, Inc. The AutoCAD® and Autodesk Inventor® applications provide a popular set of software design tools used to perform CAD functions. AutoCAD® is often times used as a 2D design and drafting tool, and Autodesk Inventor® is a 3D part and assembly modeling tool focused on mechanical design and drafting that also allows users to create 2D documents. Due to the different market needs of these applications, the AutoCAD® and Autodesk Inventor® application do not usually use the same format for storing 2D design documents. They also do not offer identical capabilities for creating and editing 2D geometric views and annotations. AutoCAD® documents are the de facto standard for communicating designs in many businesses, so there is frequently a need to translate 2D design documents created by the Autodesk Inventor® product into AutoCAD® documents. Such translations result in many of the same problems set forth above. For example, translations often need to be repeated and changes made to a drawing using the target application may be lost and need to be redone. One of ordinary skill in the art will recognize, however, that the teachings of the present invention can be adapted for use with a variety of other drawing applications, whether currently available or later developed.

Figure 1:
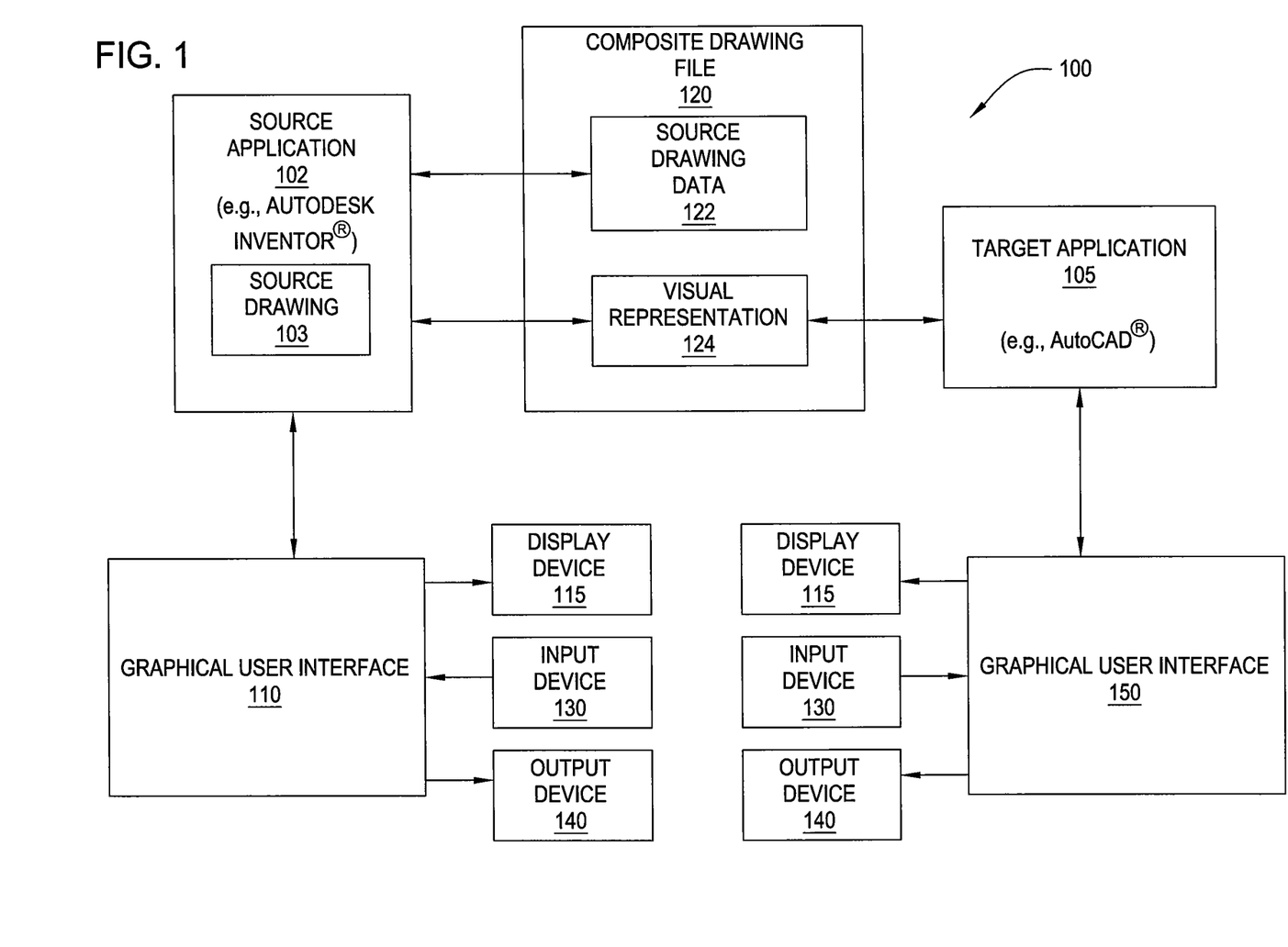
FIG. 1 is a block diagram illustrating a computer system configured to provide drawing interoperability between different CAD applications, according to one embodiment of the invention.

FIG. 1 is a block diagram illustrating a computer system 100 configured to provide drawing interoperability between different CAD applications, according to one embodiment of the invention. The components illustrated in system 100 are included to be representative of computer software applications executing on existing computer systems, e.g., desktop computers, server computers, laptop computers, tablet computers, and the like. Of course, the software applications described herein, however, are not limited to any particular computing system and may be adapted to take advantage of new computing systems as they become available.

Additionally, the components illustrated in system 100 may be implemented as software applications that execute on a single computer system or on distributed systems communicating over computer networks such as local area networks or large, wide area networks, such as the Internet. For example, system 100 may include a graphical user interface (GUI) 150 executing on a client computer system at one physical location communicating with a target application 105 at another physical location. Also, target application 105 and GUI 150 may be provided as an application program (or programs) stored on computer readable media such as a CD-ROM, DVD-ROM, flash memory module, or other tangible storage media.

As shown, system 100 includes, without limitation, a source application 102, a target application 105, a graphical user interface (GUI) 110, GUI 150, a composite drawing file 120, a set of display devices 115, a set of input devices 130, and a set of output devices 140. Source application 102 and target application 105 may be any two software applications used to compose computer-based drawings. For example, source application 102 may be the Autodesk Inventor® drawing program and target application 105 may be the AutoCAD® drawing program (or vice-versa), both available from Autodesk, Inc.

GUI 110 provides users with a graphical interface to the functions and features of source application 102. Similarly, GUI 150 provides users with a graphical interface to the functions and features of target application 105. GUIs 110 and 150 may include any combination of graphical elements such as windows, menus buttons, ribbons, dialog boxes, etc. In one embodiment, GUI 110 and 150 may be configured to generate a visual representation of the CAD drawing stored in composite drawing file 120. When viewed using source application 102 and GUI 110, the visual display of CAD drawing is generated using source drawing data 122, and when viewed using target application 105 and GUI 150, the visual display of the CAD drawing is generated using visual representation 124. User input devices 130 typically include a mouse and keyboard, display devices 115 may include computer monitors, and output devices 140 may include computer printers.

As shown, source application 102 includes a source drawing 103. Source drawing 103 may include any collection of drawing elements or data generated or modified using source application 102. For example, source application 102 may be a drawing composed using the Autodesk Inventor® drawing program. In one embodiment, source application 102 may be configured to generate composite drawing file 120. Of course, it is also contemplated that composite drawing file 120 may be generated by other means, for example by a separate application. Source application 102 may be configured to generate composite drawing file 120 according to the drawing file format of target application 105. The drawing file format of the target application may be configured to support the embedding of arbitrary data objects within a drawing file, even though the target application may not understand the internal format of such data objects. In other words, the drawing file format used by target application 105 may allow a drawing file be used as a container for information not directly used or processed by the target application (other than to store and retrieve such information from a drawing file).

Also as shown, composite drawing file 120 includes source drawing data 122 and a visual representation 124. In one embodiment, source drawing data 122 is a copy of the source drawing 103, where the format of the source drawing data is the same as the format used by source application 102. In other words, both source drawing 103 and source drawing data 122 are formatted in the native format of source application 102 ("source format"). Visual representation 124 may also be generated by source application 102; however, visual representation 124 provides a highly accurate version of source drawing data 122 in a data format appropriate for target application 105 ("target format"). For example, visual representation 124 may be generated in the drawing format used by the AutoCAD® application from a set of native drawing data defined according to the drawing format of the Autodesk Inventor® program. Thus, composite drawing file 120 includes two copies of source drawing 103: a first copy in the source format (stored in source drawing object 122) and another copy in the target format (stored in the visual representation 124). Including two copies of source drawing 103 allows composite drawing file 120 to be viewed using either source application 102 or target application 105. Alternatively, visual representation 124 may be generated from drawing data 122 when accessing composite drawing file 120.

In one embodiment, visual representation 124 may include a subset of the non-visual objects from source drawing data 122, translated into analogous objects of the target CAD application 105. Examples of non-visual objects examples are layers and line dash pattern definitions used to create display representations of visual objects in the source drawing data 122. Additionally, for each visual object in source drawing data 122, a corresponding visual object may be created for the visual representation 124. The visual objects are created with high precision in terms of their geometric description and other attributes that affect their display, such as color. The visual objects may reference the non-visual objects (layers, line-style definitions, etc) where appropriate. Composite drawing file 120 may also include a set of non-visual objects created to store a set of mappings between the target CAD application objects and the source CAD application objects they were created from. For example, a mapping pair could include a layer object identifier in the source CAD document format and a layer object identifier in the target CAD document format. In one embodiment, the mappings are used to synchronize changes made to visual representation 124 with source data 122 when the drawing is subsequently accessed using source application 102.

As stated, a user may interact with target application 105 to make modifications to visual representation 124. That is, the user may modify the CAD drawing stored by composite drawing file 120. In such a case, a user may interact with GUI 150 and target application 105 to perform certain modifications to the visual and/or non-visual objects included in visual representation 124. For example, in one embodiment, users of target application 105 may delete elements from visual representation 124, modify colors attributes of drawing elements included in visual representation 124, or modify layer properties of line-styles used to generate displays of visual representation 124. Thus, target application 105 may be configured to allow users to add native drawing and/or non-drawing objects (native to the target application drawing file format) without modifying source drawing data 122 (used by source application 102). When target application 105 is used to add native data (i.e., data objects generated using the drawing format of target application 105), then the composite drawing file 120 may contain "native data" from both applications, allowing source application 102 and target application 105 to each play the role of "source" and "target" depending on whether acting on their "native data" (e.g., source drawing data 122) or on the visual representation (e.g., visual representation 124) of the other applications native data.

Thus, the visual representation 124 may provide a facsimile of the source drawing data 122 generated by the source application for use (e.g., viewing, deleting, etc. of the CAD drawing) in target application 105. However, changes to visual representation 124 made by the target application 105 may also result in differences between visual representation 124 and source drawing data 122. Thus, in one embodiment, source drawing data 122 may be updated to include changes made to the visual representation 124 when composite drawing file 120 is subsequently accessed by source application 102. This allows source drawing data 122 and visual representation 124 to be kept in synch with one another. The modifications to the source drawing data 122 may be performed in source application 102 prior to displaying composite drawing file 120.

In one embodiment, elements of visual representation 124 may be selected individually or in groups, and can be deleted by a user viewing this data using target application 105. For example, if a layer is made non-visible, drawing elements that are assigned to that layer are no longer displayed. Similarly, if the properties of a layer such as color or line dash pattern are changed, the properties of any geometric figures in the visual representation 124 on that layer may be modified to match. When the composite drawing file 120 is saved by the target application 105 and then accessed by the source application 102, the changes made by target application 105 are synchronized with the source drawing data 122. This may include deletion of visual elements or changes to properties as required by a particular case.

Figure 2:
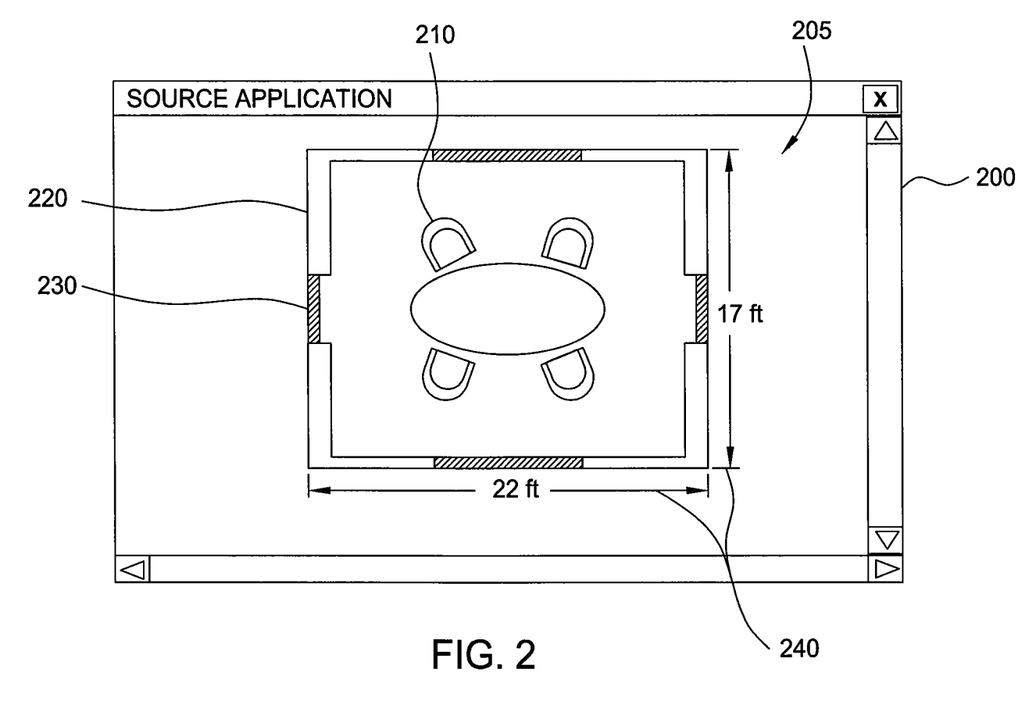
FIG. 2 illustrates a screen display generated by a source application, according to one embodiment of the invention.

FIG. 2 illustrates a screen display generated by a source application, according to one embodiment of the invention. As shown, a screen display 200 provides a plan view 205 of a room design. Illustratively, plan view 205 includes four groups of drawing elements, including elements representing furniture 210, walls 220, doors 230, and annotations 240. Annotations 240 provide the length and width dimensions of the walls 220 depicted by plan view 205. As described herein, drawing elements 210, 220, 230, and 240 may be stored in composite drawing file 120. In this example, composite drawing file 120 includes a copy of drawing elements 210, 220, 230, and 240 in the format used by source application 102 along with a copy of these drawing elements in a visual representation 124 composed according to the format of target application 105. Thus, if composite drawing file 120 is opened using the target application 105, visual representation 124 is used to generate a display of plan view 205. In contrast, if composite drawing file 120 is opened using source application 105, then source drawing data 122 is used to generate a display of plan view 205.

Figure 3A:
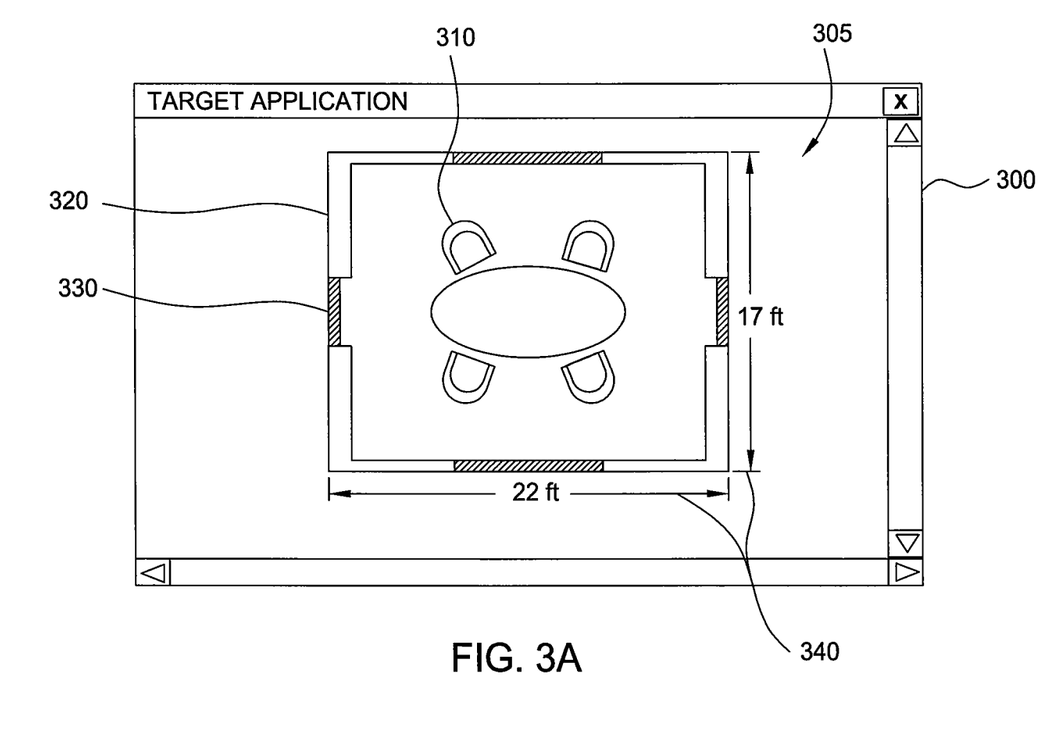
FIGS. 3A-3B illustrate a screen display generated by a target application, according to one embodiment of the invention.
Figure 3B:
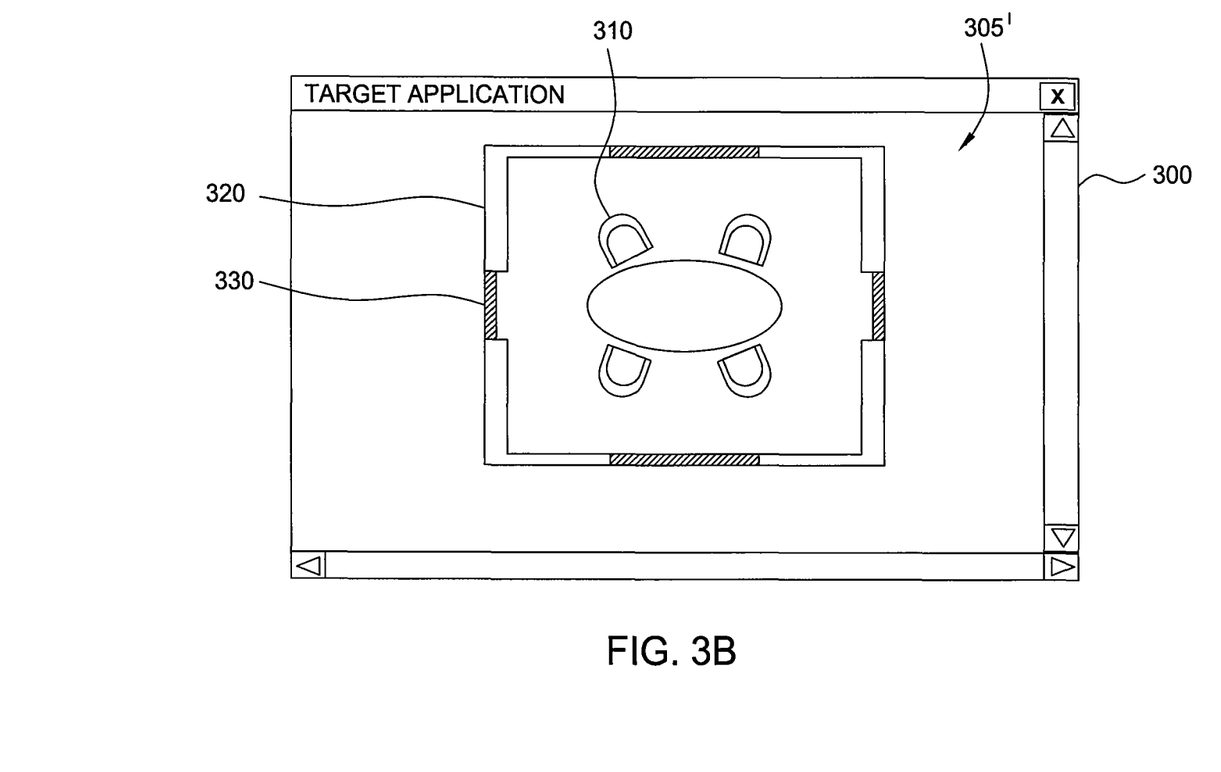

FIGS. 3A-3B illustrate a screen display generated by target application 105, according to one embodiment of the invention. As shown, screen display 300 provides a plan view 305 of the room design shown in FIG. 2. Accordingly, plan view 305 includes a graphical representation of each drawing elements included in plan view 205 of FIG. 2. Specifically, plan view 305 show elements representing furniture 310, walls 320, doors 330, and annotations 340. Thus, the visual representation of plan view 305 illustrated in FIG. 3A is visually identical to source drawing 205 of FIG. 2. However, unlike plan view 205 which is generated from source drawing data 122, plan view 305 is generated from visual representation 124.

As described, in one embodiment, a user of target application 105 may perform certain modifications to plan view 305. For example, FIG. 3B illustrates screen display 300 of plan view 305' after a user has modified plan view 305 of FIG. 3A. In this example, the user has deleted annotations 340 from plan view 305. This modification may permitted because a corresponding modification may also be performed for source drawing data 122, allowing both versions of the drawing to be kept in synch with one another. In this example, drawing elements of source drawing data 122 that describe the annotations 240 are also deleted when the composite drawing file 120 is subsequently accessed by source application 102.

Figure 4:
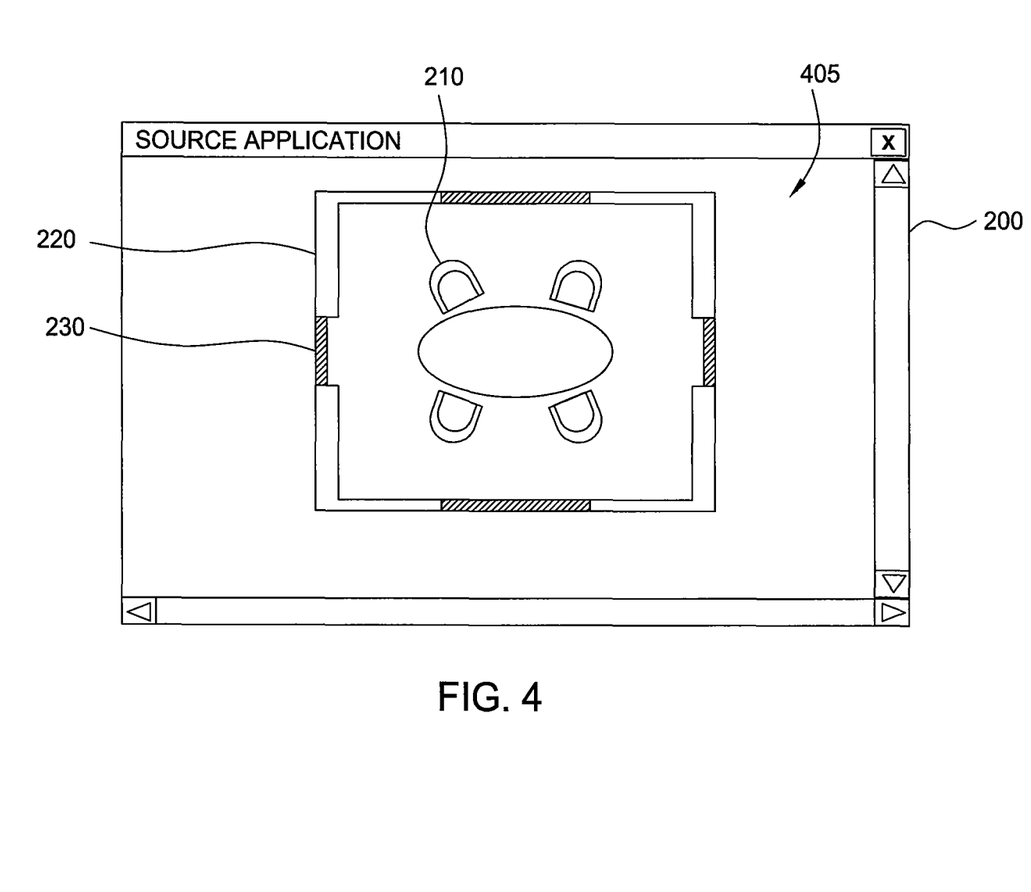
FIG. 4 illustrates a screen display generated by a source application after a drawing has been modified by a target application, according to one embodiment of the invention.

This result is shown in FIG. 4 which illustrates screen display 200 generated by source application 102 after a drawing has been modified by a target application 105, according to one embodiment of the invention. In this example, visual representation 124 of composite drawing file 120 has been modified while being viewed using target application 105 (as shown in FIG. 3B). When composite drawing file 120 is subsequently accessed by source application 102, the changes made to visual representation 124 may be synchronized with source data 122. Accordingly, as shown in FIG. 4, a plan view 405 displayed in screen display 200 differs from plan view 205 illustrated in FIG. 2. Specifically, plan view 405 does not include annotations 240 because the drawing data 122 used to generate plan view 105 has been synchronized with visual representation 124 to incorporate this modification.

As another example, assume target application 105 is used to add a text note to the visual representation 305' shown in FIG. 3B (e.g., the message "Change room dimensions to 18×24" in place of the deleted annotations 340). In such a case, the text note is added to the composite drawing file 120 according to the native format of target application 105. When composite drawing file 124 is subsequently accessed using the source application 102, the text note of the message "Change room dimensions to 18×24" would be displayed instead of the dimension annotations 340 originally stored as part of source drawing data 122.

Figure 5:
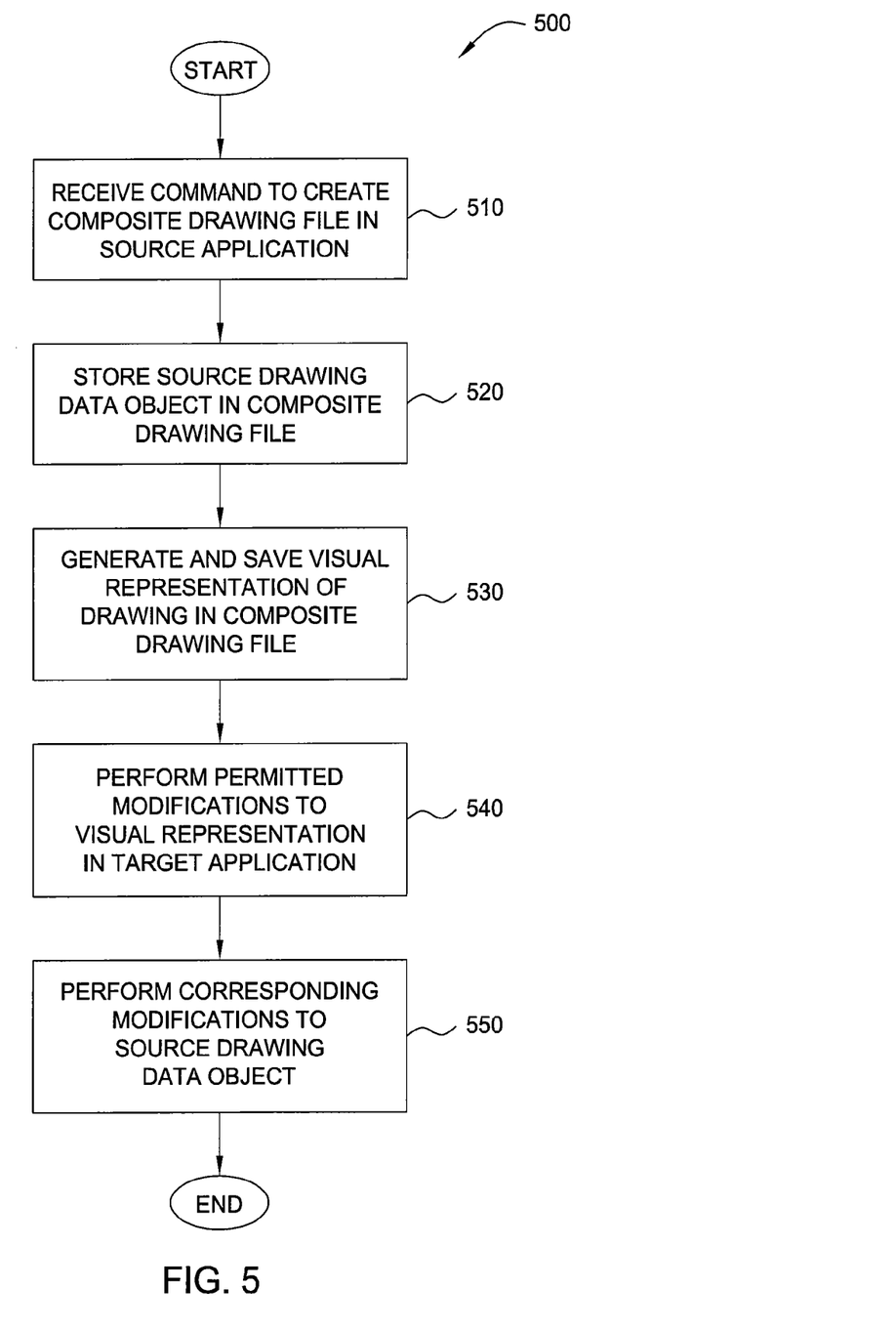
FIG. 5 illustrates a method for generating a composite drawing file that provides drawing interoperability between different CAD applications, according to one embodiment of the invention.

FIG. 5 illustrates a method 500 for generating and accessing a composite drawing file used to provide drawing interoperability between different CAD applications, according to one embodiment of the invention. Persons skilled in the art will understand that, even though the method is described in conjunction with the systems of FIGS. 1-4, any system configured to perform the steps of method 500, in any order, is within the scope of the present invention.

As shown, method 500 begins at step 510, where a user invokes a command to create a composite drawing file for a given CAD drawing. For example, a user may interact with the interface provided by the Autodesk Inventor® program to select a "save-as" menu item and specify a name for the composite drawing file. In such case, the user may also specify that the system should create a composite drawing file compatible with the Autodesk Inventor® program (as a source application) and the AutoCAD® program (as a target application). Of course, the use of the AutoCAD® and Autodesk Inventor® programs is provided as an example, and the use of other CAD applications or drawing programs is within the scope of the invention.

In response, at steps 520 and 530, source application 102 may be configured to generate the composite drawing file. First, at step 520, source application 102 (e.g., the Autodesk Inventor® application) may be configured to store source drawing data in the composite drawing file being generated. In one embodiment, the source data is stored in a composite drawing file according to the drawing format used by the source application. Second, at step 530, the source application may be configured to generate a visual representation of the drawing that is compatible with the target application. As stated, the target application may use the visual representation 124 to generate and display a highly accurate representation of the source data, without requiring the drawing to be translated into the native format used by the target application. The visual representation 124 generated for a particular source drawing data 122 (i.e., for a particular CAD drawing) may include a collection of non-visible objects representing display properties, such as layers, line styles and the like, along with a collection of visual objects generated according to the format of the target application. The visual objects are used by target application 105 to generate a display of the CAD drawing stored by composite drawing file 120 that has an appearance substantially similar to that of a visual display of the drawing generated by source application 102. Similarly, the layers, line styles and other metadata may be used by the target application to generate a highly accurate visual presentation of the drawing represented by source drawing data 122.

Additionally, the visual representation 124 may include a set of mappings between elements of the source drawing data and the visual representation generated for composite drawing file 120. The mappings may be used to synchronize the source drawing data with visual representation 124, provided the latter is modified by the user interacting with composite drawing file 120, target application 105, and GUI 150. For example, if one of the visual objects is deleted by a user viewing composite drawing file 120 using target application 105, such a deletion may be synchronized with source data 122 when the drawing is subsequently accessed by source application 102.

Once generated, the composite drawing file may be saved and provided to a user of the target application (e.g., the AutoCAD® program). Users of the target application may access (and in some cases edit) the drawing included in composite drawing file. For example, the user may interact with GUI 150 of FIG. 1 to instruct target application 105 to open composite drawing file 120. In response, the target application 105 may access the data objects stored in the visual representation included in the composite drawing file and generate a visual display of the drawing stored therein. At step 540, a user may perform one or more permitted modifications to the visual representation of the drawing using tools provided by GUI 150. In one embodiment, the permitted modifications may be limited to those that can be identified by source application 102 and synchronized with source drawing data 122. Examples of such modifications include deleting visual drawing objects from the visual representation and modifying the display properties (e.g., line color or line style) of the drawing object in the visual representation. Of course, what editing features are provided for the drawing objects in the visual representation may be tailored to suit the needs of an individual case.

At step 550, after the user of the target application has completed viewing and/or editing the visual representation of the drawing included in the composite drawing file, the visual representation may be saved and provided to a user of the source application. When the composite drawing file is then accessed using the source application, any changes made to the visual representation may be synchronized with the source drawing data so that the changes are also reflected in the source drawing.

Advantageously, embodiments of the invention provide techniques for drawing interoperability between different CAD applications. Rather than translating a drawing format from the format of a source application to that of a target application, the invention enables the source application to embed a copy of the drawing in the format of the source application within a composite drawing file. Additionally, the invention enables a highly accurate visual representation of the source drawing to be stored in the composite drawing file. This visual representation of the source drawing may be processed by the target application to generate a highly accurate visual display of the CAD drawing.

In some embodiments, some aspects of the visual representation may be edited using the target application, for example object deletion or visibility/color control. If a user modifies the visual representation of the source drawing using the target application, the modifications are synchronized with the copy of the source drawing when the composite drawing file is accessed using source application.

Further, as stated, the target application may also be used to add native objects (i.e., objects created using the drawing format of the target application) objects to the drawing. In such a case, the roles of "source application" and "target application" become effectively reversed. Any such objects may be the basis of a visual representation viewed using the original "source application." Thus, the composite drawing file may contain "native data" associated with both the source application and target application, and may also contain a visual representation of that native data for viewing/editing performed using the other application. Since native data from both the source and target application is maintained in a single document, synchronization problems between the different CAD applications may be eliminated, allowing the document to be used for many different purposes by users of both CAD applications.

While the forgoing is directed to embodiments of the present invention, other and further embodiments of the invention may be devised without departing from the basic scope thereof, and the scope thereof is determined by the claims that follow.

What is claimed is:

1. A method of generating a drawing file shared by a source application and a target application, comprising:
   storing a copy of a computer aided design (CAD) drawing in a composite drawing file, wherein the CAD drawing is stored according to a drawing format used by the source application;
   generating a visual representation of the CAD drawing, wherein the visual representation is formatted according to a drawing format used by the target application; and
   storing the visual representation in the composite drawing file, wherein a display of the visual representation generated by the target application reflects a display of the CAD drawing generated by the source application.

2. The method of claim 1, wherein the composite drawing file is generated by the source application according to a drawing file format specified for the target application.

3. The method of claim 1, wherein the visual representation includes a set of non-visual objects from the CAD drawing translated into the format of the target application, a set of visual objects from the CAD drawing translated into the format of the target application, and a set of object mappings, wherein each object mapping provides a mapping from a different one of the visual objects in the CAD drawing to a corresponding visual object in the visual representation.

4. The method of claim 3, wherein the non-visual objects include at least one of a layer definition, a line-type display property, and a line-color display property specified for one of the visual objects in the CAD drawing.

5. The method of claim 3, wherein at least one aspect of the visual representation is configured to be modifiable using the target application.

6. The method of claim 5, wherein the modifiable aspect of the visual representation includes at least one of deleting one of the visual objects from the visual representation and modifying a display property associated with the visual representation.

7. The method of claim 1, further comprising:
   accessing the visual representation of the CAD drawing using the target application;
   adding one or more drawing objects to the composite drawing file wherein the one or more drawing objects are configured according to the format of the target application;
   generating a visual representation of the one or more drawing objects, wherein the visual representation is formatted according to a drawing format used by the target application; and
   storing the visual representation of the one or more drawing objects in the composite drawing file, wherein a display of the visual representation generated by the source application reflects a display of the one or more drawing objects generated by the target application.

8. The method of claim 1, further comprising:
   accessing the copy of the CAD drawing using the source application;
   determining that the visual representation of the CAD drawing has been modified by the target application; and
   synchronizing the copy of the CAD drawing with the modified visual representation, wherein a display of the synchronized copy of the CAD drawing generated by the source application a display of the modified visual representation generated by the target application.

9. A non-transitory computer-readable storage medium storing instructions for generating a drawing file shared by a source application and a target application, including instructions for performing the steps of:
   storing a copy of a computer aided design (CAD) drawing in a composite drawing file, wherein the CAD drawing is stored according to a drawing format used by the source application;
   generating a visual representation of the CAD drawing, wherein the visual representation is formatted according to a drawing format used by the target application; and
   storing the visual representation in the composite drawing file, wherein a display of the visual representation generated by the target application reflects to a display of the CAD drawing generated by the source application.

10. The non-transitory computer-readable medium of claim 9, wherein the composite drawing file is generated by the source application according to a drawing file format specified for the target application.

11. The non-transitory computer-readable medium of claim 9, wherein the visual representation includes a set of non-visual objects from the CAD drawing translated into the format of the target application, a set of visual objects from the CAD drawing translated into the format of the target application, and a set of object mappings, wherein each object mapping provides a mapping from a different one of the visual objects in the CAD drawing to a corresponding visual object in the visual representation.

12. The non-transitory computer-readable medium of claim 11, wherein the non-visual objects include at least one of a layer definition, a line-type display property, and a line-color display property specified for one of the visual objects in the CAD drawing.

13. The non-transitory computer-readable medium of claim 11, wherein at least one aspect of the visual representation is configured to be modifiable using the target application.

14. The non-transitory computer-readable medium of claim 13, wherein the modifiable aspect of the visual representation includes at least one of deleting one of the visual objects from the visual representation and modifying a display property associated with the visual representation.

15. The non-transitory computer-readable medium of claim 9, wherein the target application includes instructions for performing the steps of:
   accessing the visual representation of the CAD drawing using the target application;
   adding one or more drawing objects to the composite drawing file wherein the one or more drawing objects are configured according to the format of the target application;
   generating a representation of the one or more drawing objects, wherein the visual representation is formatted according to a drawing format used by the target application; and
   storing the visual representation of the one or more drawing objects in the composite drawing file, wherein a display of the visual representation generated by the source application reflects a display of the one or more drawing objects generated by the target application.

16. The non-transitory computer-readable medium of claim 9, wherein the instructions further comprise instruction for performing the steps of:
   accessing the copy of the CAD drawing using the source application;
   determining that the visual representation of the CAD drawing has been modified by the target application; and
   synchronizing the copy of the CAD drawing with the modified visual representation, wherein a display of the synchronized copy of the CAD drawing generated by the source application reflects a display of the modified visual representation generated by the target application.

17. A method of creating a composite drawing file shared by a source application and a target application:
   composing a computer aided design drawing (CAD) using the source application; and
   invoking a file creation tool configured to save the CAD drawing in a composite drawing file, wherein the tool is configured to:
      store a copy of a computer aided design (CAD) drawing in a composite drawing file, wherein the CAD drawing is stored according to a drawing format used by the source application, and wherein the composite drawing file is generated by the source application according to a drawing file format specified for the target application,
      generate a visual representation of the CAD drawing, wherein the visual representation is formatted according to a drawing format used by the target application, and
      store the visual representation in the composite drawing file, wherein a display of the visual representation generated by the target application reflects a display of the CAD drawing generated by the source application.

18. The method of claim 17, wherein the visual representation includes a set of non-visual objects from the CAD drawing translated into the format of the target application, a set of visual objects from the CAD drawing translated into the format of the target application, and a set of object mappings, wherein each object mapping provides a mapping from a different one of the visual objects in the CAD drawing to a corresponding visual object in the visual representation.

19. The method of claim 18, wherein the non-visual objects include at least one of a layer definition, a line-type display property, and a line-color display property specified for one of the visual objects in the CAD drawing.

20. The method of claim 18, wherein at least one aspect of the visual representation is configured to be modifiable using the target application.

21. The method of claim 18, wherein the modifiable aspect of the visual representation includes at least one of deleting one of the visual objects from the visual representation and modifying a display property associated with the visual representation.

22. The method of claim 17, further comprising:
   accessing the copy of the CAD drawing using the source application;
   determining that the visual representation of the CAD drawing has been modified by the target application; and
   synchronizing the copy of the CAD drawing with the modified visual representation, wherein a display of the synchronized copy of the CAD drawing generated by the source application reflects a display of the modified visual representation generated by the target application.

23. The method of claim 17, further comprising:
   accessing the visual representation of the CAD drawing using the target application;

adding one or more drawing objects to the composite drawing file, wherein the one or more drawing objects are configured according to the format of the target application;

generating a visual representation of the one or more drawing objects, wherein the visual representation is formatted according to a drawing format used by the target application; and storing the visual representation of the one or more drawing objects in the composite drawing file, wherein a display of the visual representation generated by the source application reflects a display of the one or more objects generated by the target application.

* * * * *